United States Patent [19]

Staroselsky

[11] 4,142,838
[45] Mar. 6, 1979

[54] METHOD AND APPARATUS FOR PREVENTING SURGE IN A DYNAMIC COMPRESSOR

[75] Inventor: Naum Staroselsky, Des Moines, Iowa

[73] Assignee: Compressor Controls Corporation, Des Moines, Iowa

[21] Appl. No.: 856,302

[22] Filed: Dec. 1, 1977

[51] Int. Cl.$^2$ .............................................. F04B 49/00
[52] U.S. Cl. ........................................ 417/20; 417/26; 417/28; 417/47; 417/53
[58] Field of Search ....................... 417/26, 53, 28, 18, 417/19, 20, 22, 24; 415/1, 11, 17

[56] References Cited

U.S. PATENT DOCUMENTS

| 3,362,626 | 1/1968 | Schlirf | 417/47 |
| 3,574,474 | 4/1971 | Lukaes | 417/307 |
| 3,737,252 | 6/1973 | Pilarczyk | 417/53 |
| 3,994,623 | 11/1976 | Ruthstein | 417/47 |
| 4,046,490 | 9/1977 | Ruthstein | 417/28 |

Primary Examiner—William L. Freeh
Attorney, Agent, or Firm—Henderson, Sturm, Cepican & Fix

[57] ABSTRACT

A control apparatus for antisurge protection of a dynamic compressor including a junction of a closed antisurge loop with a surge limit computing module and a two mode controller with a relay backup system with deviation alarms is characterized in operation in that during a slow disturbance, the two mode controller provides modulated antisurge protection by opening a relief valve, if the operating point of the compressor crosses the surge control line and during a dangerously fast disturbance, the relay backup system provides antisurge protection if a preestablished deviation of the operating point from the surge control line appears. A relay backup system opens the relief valve very quickly. When the relief valve is so opened, the process of the user of fluid from the compressor is compensated by increasing the performance of the compressor to maintain pressure or flow rate. Then the relay system closes the relief valve with a relatively slow speed, which prevents a dangerous deviation of the operating point from the surge control line. In time, the surge limit line may change so that the surge control line is no longer correctly placed. If under such circumstances surge appears, then the backup relay system opens the relief valve very fast, closes it with a relatively slow speed and changes the position of surge control line.

5 Claims, 2 Drawing Figures

METHOD AND APPARATUS FOR PREVENTING SURGE IN A DYNAMIC COMPRESSOR

BACKGROUND OF THE INVENTION

As is well known, the process control systems of compressors are designed for changing their performance to fit the requirements of the user's process, e.g., to control discharge pressure or flow rate. On the other hand, in order to protect the compressor from approaching the surge zone, an antisurge protective system must limit the possible range of safe operation by a surge control line. If an operating point of the compressor having the conventional control and protective loops reaches the surge control line, then a counteraction between the process control loop and antisurge protective loop appears. The process control loop can continue to move the operating point towards the surge zone and this interferes with the protective system designed to keep the compressor from approaching the surge zone, especially when the protective loop controlling the relief valve includes one or more elements having nonlinearities, e.g., hysteresis or dead zone.

The deviation of compressor operating point from the surge control line depends on the speed of the disturbance and the magnitude of dead zone or hysteresis. It is well known that conventional antisurge protective systems are not able to prevent the operating point of a compressor from crossing its surge limit line if the disturbances are very big or very fast and are not able to stop surge if it appears. However, the same conventional systems may stop the operating point of a compressor on the surge control line, without dangerous deviation, only under slow disturbances. The operation of such antisurge protective system may be considerably improved during fast disturbances by a fast opening of the relief valve, when a preestablished deviation of the operating point of the compressor from the surge control line appears, and then by slow closing of said valve. This may also stop surge at the very beginning if the location of surge control line is changed at the same time.

SUMMARY OF THE INVENTION

The main purpose of this invention is to protect compressor from approaching the surge zone, to minimize the possible deviation of the operating point of the compressor from the surge control line and to stop surge if the surge control line is no longer correctly placed. The main advantage of this invention is the much higher reliability of control of the compressor when operating close to the surge control line. This advantage permits an expansion of the safe operating zone of the dynamic compressor and also increases the safety of operation of the process using the compressed gas.

According to this invention two control devices protect the dynamic compressor from approaching the surge zone. The first device is a two mode antisurge controller operating the relief valve. The second device is a backup relay system, which first opens the same relief valve completely and then slowly closes the relief valve. Both opening and closing of the relief valve are compensated by a corresponding change of the performance of the compressor to maintain pressure or flow rate.

An object of this invention is to replace a fast disturbance, which could cause a dangerous deviation of the operating point of the compressor from the surge control line, by the slow closing of relief valve which may be easily compensated by the operation of a two mode antisurge controller.

Another object of this invention is to protect the process of the user from fast changes of pressure and/or flow rate while the antisurge protective system quickly opens the relief valve and then closes it.

Still another object of this invention is to stop surge at the very beginning if the surge control line is not correctly placed.

A still further object is to provide a control apparatus of a type described above, which is characterized by its simplicity, great transient and steady state precision and high reliability.

Other objects, advantages and novel features of the invention will become apparent from the following detailed description of the invention when considered in conjunction with the accompanying drawings.

DESCRIPTION OF THE PREFERRED EMBODIMENT

Figure 1:
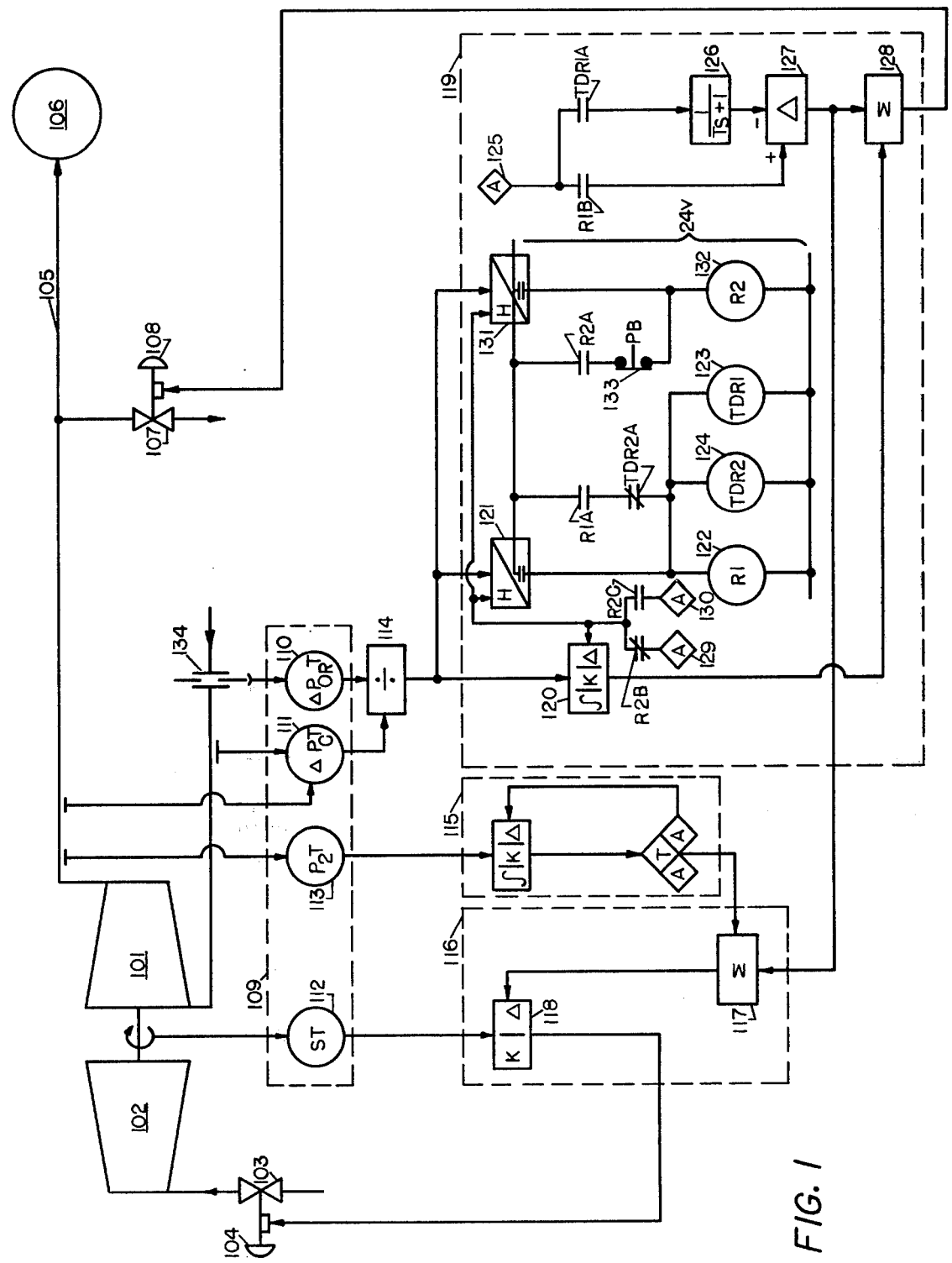
FIG. 1 is a schematic diagram of the control system of dynamic compressor.

Referring now to the drawings wherein like reference numerals designate identical or corresponding parts throughout the several views, FIG. 1 shows a compressor installation with a control system including a protective module constructed in accordance with the present invention. The installation includes a dynamic compressor 101 for compressing a gas, a turbine drive 102 having a steam distributing means 103 with an actuator 104, and a pipeline 105 connecting the compressor 101 with a user 106 of compressed gas. The pipeline 104 is supplied by relief means 107 having an actuator 108.

The control system of the FIG. 1 compressor installation consists of five control modules.

The first of such control modules is a module 109 including four transmitters: (a) a pressure differential transmitter 110 measuring a pressure differential across the inlet orifice 134; (b) a pressure differential transmitter 111 measuring the pressure differential across the compressor 101; (c) a speed transmitter 112; and (d) a discharge pressure transmitter 113.

The second control module is a computing module indicated by numeral 114. In this particular case said computing module includes only one element: a divider 114.

As is well known, the equation of the surge control line may be presented as follows:

$$(\Delta P_c / \Delta P_{or}) = K \quad (1)$$

where:
$\Delta P_c$ is the pressure differential across the compressor;
$\Delta P_{or}$ is the pressure differential across inlet orifice, and
K is the constant coefficient.

The divider 114 provides for calculating the left part of the equation (1).

A third control module of the disclosed system is the process control module 115 which consists of a two mode discharge pressure controller with an auto-manual control station. The process control module 115 receives its input signal from the discharge pressure transmitter 113 of the module 109. The output signal of process control module 115 enters a performance control module 116. The module 116 includes a proportional speed controller 118 and a summer 117 which produces a set point for the speed controller 118. The summer 117 also receives one of output signals from a protective control module 119.

The protective control module 119 includes a two mode antisurge controller 120 with manual control stations 129 and 130, deviation alarms 121 and 131, auxiliary relays 122 and 132, two time delay relays 123 and 124, a manual control station 125, a dynamic compensator 126, a subtractor 127 and a summer 128. The output signal of divider 114 is the input signal for the two mode antisurge controller 120 and the deviation alarms 121 and 131. A set point for the antisurge controller 120 and for the deviation alarms 121 and 131 is chosen to satisfy the demands of equation (1). An output signal of the deviation alarm 121 appears only when the deviation of the left part of equation (1) becomes equal to some preestablished value $K_1$. An output signal of the deviation alarm 131 appears analogously when the deviation of the left part of equation (1) becomes equal to some preestablished value $K_2$ which is bigger than $K_1$ and definitely corresponds to the beginning of surge.

The output signal of the deviation alarm 121 enters the auxiliary relay 122, having two pairs of normally opened contacts R1A and R1B. As a result of such appearing of the output signal of alarm 121, the contacts R1A and R1B are closed and the two time delay relays 123 and 124 are energized. The time delay relay 123 has one pair of normally opened contacts TDR1A. The relay 124 has normally closed contacts TDR2A.

If all three relays 122, 123 and 124 are energized, then an output signal of a manual control station 125 enters a first input of the subtractor 127. A second input of said subtractor 127 is connected to a dynamic compensator 126 which receives its input signal from the above manual control station 125 through the contact TDR1A.

Thus, after the output signal of the alarm 121 appears, the output signal of subtractor 127 increases by step up to a preestablished value and then with a time delay $T_1$ begins to decrease exponentially up to zero. A speed of decreasing of the output signal of subtractor 127 depends on the time constant T of dynamic compensator 126.

The relays 122, 123 and 124 are energized by the contact R1A until both input signals of subtractor 127 become equal. Then the time delay relay 124 opens its contacts TDR2A. As a result all three relays 122, 123 and 124 are deenergized.

The output signals of subtractor 127 enters two summers 128 and 117. The summer 128 receives also the output signal of the controller 120 and operates the relief valve 107 through its actuator 108. The summer 117 compensates for an influence of the fast opening and then closing of the relief valve 107 on the process of the user while the output signal of subtractor 127 varies.

The above time constant T of the dynamic compensator 126 is chosen so that the two mode controller 120 is able to compensate for the decrease of the output signal of summer 127 while operating point of the compressor 101 again reaches the surge control line. At this time the dead zone and hysteresis of the actuator 108 do not influence the transient process.

The output signal of the deviation alarm 131 energizes the auxiliary relay 132, having one pair of normally closed contacts R2A and two pairs of normally opened contacts R2B and R2C. If the relay 132 is energized, then the manual control station 130 replaces the manual control station 129, decreasing the set point for the controller 120 and for both deviation alarms 121 and 131. As a result, the surge control line moves in the safe direction. At the same time, the contact R2B continues to energize the relay 132 even if the output signal of deviation alarm 131 disappears. A pushbutton 133 provides for a manual reset of the relay 132.

Figure 2:
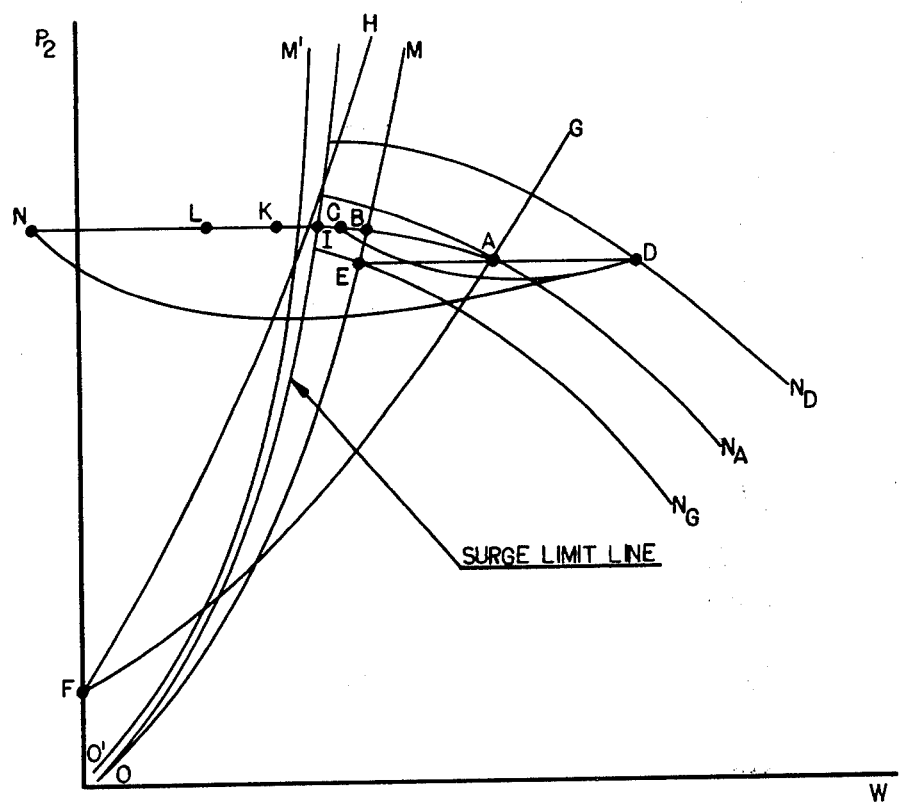
FIG. 2 shows a compressor map with plotted lines representing operating conditions.

The operation of the control system shown in FIG. 1 may be illustrated by the following example (see FIG. 2). Assume that at an initial moment the operating point of the compressor is A and the load curve is F G. Then as a result of the load change, the load curve moves up to a new position F H (FIG. 2) by step.

However, the pressure controller 115, in trying to keep the required level of pressure, moves the operating point of the compressor 101 in the direction of surge control line OM. When the operating point reaches the surge control line at point B, the output signal of the two mode antisurge controller 120 appears. In spite of the operation of the antisurge controller 120, the valve 107 begins to open only after the output signal of the summer 128 increases up to same value which is due to the magnitudes of dead zone and hysteresis of the actuator 118.

As a result, the operating point of the compressor crosses the surge control line OM. When the deviation of the operating point from the surge control lines becomes equal to the setting of the deviation alarm 121 (see point "C" on FIG. 2) the output signal of the alarm 121 appears, the contacts R1A and R1B are closed and the relays 123 and 124 are energized. As a result, the output signal of the manual control station 125 which corresponds to complete opening of the relief valve 107 enters the summer 128 through the subtractor 127. The relief valve 107 begins to open fast. At the same time the output signal of the station 125 enters the summer 117 through the same subtractor 127, compensating for the opening of relief valve 107 by increasing the speed of rotation of the compressor.

The combined operation of the relief valve 107 and the speed controller 116 causes moving of the operating point of the compressor from the point C to the point D on the compressor map (FIG. 2). The output signals of the controller 120 and deviation alarm 121 disappear. However, the contact R1A provides for energizing of the relays 122, 123 and 124.

After the valve 107 is completely opened, the relay 123 closes its contacts TDR1A and the output signal of subtractor 127 begins to exponentially decrease. As a result, the valve 107 begins to close and the speed of rotation begins to decrease correspondingly.

When the operating point of compressor reaches the surge control line OM a second time (see point E), the output signal of antisurge controller 120 appears again. The increase of this signal follows the decrease of the output signal of the subtractor 127. Consequently, the operating point of the compressor is kept on the surge control line OM until the output signal of the subtractor 127 reaches a zero value and the relay 124 opens its contacts TDR2.

Assume further that at initial moment the compressor operating point is "A" again and the load curve is F G. Assume also that the surge control line does not place correctly, see curve O'M', FIG. 2. Then as a result of the load change, the load curve moves up to a new position FH by step. However, the pressure controller 115 moves the operating point of the compressor toward the surge limit line. After the operating point crosses the surge limit line at the point "I", FIG. 2, surge begins and the flow rate through the compressor 101, FIG. 1, drops up to the negative value very quickly. However, the discharge pressure begins to decrease with same time delay, for example, see part IKLN of the transient process in FIG. 2. As a result, the value calculated by the divider 115, FIG. 1, increases. The output signals of both deviation alarms 121 and 131 appear almost simultaneously, see points K and L in FIG. 2, energizing the relays 122, 123, 124 and 132.

The output signal of the manual control station 125 then enters the summer 128. The relief valve 107 begins to open very fast. At the same time the manual control station 129 is replaced by the manual control station 130. As a result, the set point for the controller 120 is changed and the surge control line moves to the position O M. After the relay 123 closes its contact TDR1A, the relief valve 107 begins to close exponentially.

When the operating point of the compressor 101 reaches a new surge control line O M at the point E, the controller 120 begins to compensate for the decrease of the output signal of the subtractor 127. Consequently, the operating point of the compressor is kept on the surge control line.

Obviously many modifications and variations of the present invention are possible in light of the above teachings. It is therefore to be understood that, within the scope of the appended claims, the invention may be practiced otherwise than as specifically described.

I claim:

1. A method of antisurge protection for a dynamic compressor with a variable performance having a discharge port and an operating point within a safe operating zone limited by a surge control line, a pipeline connecting said discharge port to a user of a compressed gas, a control member including a fluid relief means capable of moving an operating point of the compressor along its required operating line by changing its performance, a control system providing for the required operating line, a closed protective loop for preventing the operating point of the compressor from approaching a surge zone, said method comprising:

controlling a position of said fluid relief means by said closed protective loop after the operating point of the compressor, moving along its required operating line, crosses said surge control line in order to keep said operating point on the surge control line until there is a deviation of the operating point from the surge control line which reaches preestablished value;

adjustably opening said fluid relief means as quickly as possible after said deviation of the operating point from the surge control line reaches said preestablished value, and then exponentially closing said fluid relief means;

controlling the position of said fluid relief means by said closed protective loop after the operating point of the compressor crosses said surge control line again as a result of the exponential closing of said fluid relief means and changing the performance of the compressor in order to keep the operating point of the compressor on the surge control line with a minimum deviation; and changing the location of said surge control line in a direction away from the surge limit line if surge begins.

2. A control apparatus for antisurge protection of a dynamic compressor having suction and discharge ports and a safe operating zone limited by a surge control line, a pipeline connecting said discharge port to a user of a compressed gas, a control member capable of moving an operating point of the compressor along its required operating line by changing its performance, a fluid relief means connected to said pipeline, a flow measuring device installed in said suction port, a pressure differential transmitter means for measuring the pressure differential across said measuring device, a pressure differential transmitter means for measuring a pressure differential across said dynamic compressor, a process control means providing for said required operating line by changing the position of said control member, a calculating means for defining a ratio between said pressure differential across the dynamic compressor and the pressure differential across said measuring device in the suction port, and a controller receiving an output signal from said calculating means and a set point signal for keeping the operating point of the compressor inside of a safe operating zone limited by said surge control line, by opening said fluid relief means, the improvement comprising:

first and second backup deviation alarm means for receiving the same input signals as said controller, an output signal of said first backup deviation alarm means appearing while the deviation between said output signal of the calculating device and said set point signal becomes equal to a first preestablished value, an output signal of said second deviation alarm means appearing after the deviation between said output signal of the calculating device and said set point signal becomes equal to a second preestablished value corresponding to the beginning of surge;

a group of relay means including a first auxiliary relay means with first and second pairs of normally open contacts;

a first time delay relay means with one pair of normally opened contacts and a second time delay relay means with one pair of normally closed contacts;

said first auxiliary relay means and both time delay relay means becoming energized after an output signal of said first backup deviation alarm means appears and being kept energized until said normally closed contacts of the second time delay relay means becomes opened even if said output signal of the first backup deviation alarm means disappears;

a manual control station providing for a preestablished signal;

a dynamic compensator means being connected to said manual control station through the normally opened contact of said first time delay relay means, an output signal of said dynamic compensator means being increased exponentially after closing the contacts of said first time delay relay means;

a subtractor means being connected to said manual control station and to said dynamic compensator means, said subtractor means receiving one of its input signals from said manual control station through said second pair of contacts of said first auxiliary relay means and consequently increasing its output signal by a step while said contacts of first auxiliary relay means are closed and exponentially decreasing its output signal while said contacts of the first time delay relay means are also closed;

a summer means for controlling a position of said fluid relief means, said summer means summarizing output signals of said subtractor means and said controller;

a summer means controlling a position of said controlled member and consequently changing the performance of the compressor, said summer means receiving its input signals from said process control means and said subtractor means;

a relay switch means being energized and changing its position while the output signal of said second deviation alarm means appears, said relay switch means being kept energized until it is manually reset;

means for providing for a manual reset of said relay switch; and first and second manual control station means for developing two set points for said surge control line, said first and second manual control station means being connected to said controller and to said first and second backup deviation alarm means through said relay switch means.

3. A method of antisurge protection for a dynamic compressor with a variable performance having a discharge port and an operating point within a safe operating zone limited by a surge control line, a pipeline connecting said discharge port to a user of a compressed gas, a fluid relief means connected to said pipeline and a closed protective loop for preventing the operating point of the compressor from approaching a surge zone, said method comprising:

controlling the position of said fluid relief means by said closed protective loop after the operating point of the compressor crosses said surge control line in order to keep said operating point on the surge control line until there is a deviation of the operating point from the surge control line which reaches a preestablished value;

adjustably opening said fluid relief means as quickly as possible after said deviation of the operating point from the surge control line reaches said preestablished value and then exponentially closing said fluid relief means; and controlling the position of said fluid relief means by use of said closed protective loop after the operating point of the compressor crosses said surge control line again as a result of the exponential closing of said fluid relief means in order to keep the operating point of the compressor on the surge control line with a minimum deviation.

4. A control apparatus for antisurge protection of a dynamic compressor having suction and discharge ports and a safe operating zone limited by a surge control line, a pipeline connecting said discharge port to a user of a compressed gas, a fluid relief means connected to said pipeline, a flow measuring means connected to said apparatus for measuring the flow through the compressor, a pressure differential transmitter means for measuring the pressure differential across said measuring device, a pressure differential transmitter means for measuring a pressure differential across said dynamic compressor, a calculating means for defining a required relationship between said pressure differential across the dynamic compressor and the pressure differential across said flow measuring means, and a controller means for receiving an output signal from said calculating means and a set point signal for keeping the operating point of the compressor inside of a safe operating zone limited by said surge control line, by opening said fluid relief means, the improvement comprising:

a backup deviation alarm means for receiving the same input signals as said controller, an output signal of said backup deviation alarm means appearing while the deviation between said output signal of the calculating device and said set point signal becomes equal to a preestablished value;

a group of relay means including an auxiliary relay means with one pair of normally open contacts;

a time delay relay means with one pair of normally closed contacts;

said auxiliary relay means and time delay relay means being for becoming energized after an output signal of said backup deviation alarm means appears and being kept energized until said normally closed contacts of the time delay relay means becomes opened even if said output signal of the backup deviation alarm means disappears;

a manual control station means providing for a preestablished signal;

a dynamic compensator means being connected to said manual control station through the normally opened contact of said auxiliary relay means, an output signal of said dynamic compensator means being increased exponentially after closing the contacts of said auxiliary relay means;

a subtractor means being connected to said manual control station and to said dynamic compensator means, said subtractor means being for receiving one of its input signals from said manual control station through the contacts of said auxiliary relay means and another one from said dynamic compensator means and consequently increasing its output signal by a step and then exponentially decreasing it; and a summer means for controlling the position of said fluid relief means, said summer means being for summarizing the output signals of said subtractor means and said controller means.

5. A control apparatus for antisurge protection of a dynamic compressor having suction and discharge ports and a safe operating zone limited by a surge control line, a pipeline connecting said discharge port to a user of a compressed gas, a fluid relief means connected to said pipeline, a flow measuring means for measuring the flow through the compressor, a pressure differential transmitter means for measuring the pressure differential across said flow measuring means, a pressure differential transmitter means for measuring a pressure differential across said dynamic compressor, a calculating means for defining a required relationship between said pressure differential across the dynamic compressor and the pressure differential across said flow measuring means, and a controller means for receiving an output signal from said calculating means and a set point signal for keeping the operating point of the compressor inside of a safe operating zone limited by said surge control line, by opening said fluid relief means, the improvement comprising:

a first and second backup deviation alarm means for receiving the same input signals as said controller means, an output signal of said first backup deviation alarm means appearing while the deviation between said output signal of the calculating means and said set point signal becomes equal to a first preestablished value, an output signal of said second deviation alarm means appearing after the deviation between said output signal of the calculating means and said set point signal become equal to a second preestablished value corresponding to the beginning of surge;

a group of relay means including an auxiliary relay means with first and second pairs of normally open contacts and a time delay relay means with one pair of normally closed contacts, said auxiliary relay means and time delay relay means becoming energized after an output signal of said first backup deviation alarm means appears and being kept energized until said normally closed contacts of the time delay relay means become opened even if said output signal of the first backup deviation alarm means disapears;

a manual control station means providing for a preestablished signal;

a dynamic compensator means being connected to said manual control station means through the normally opened contact of said auxiliary relay means, an output signal of said dynamic compensator means being increased exponentially after closing the contacts of said auxiliary relay means;

a subtractor means being connected to said manual control station means and to said dynamic compensator means, said subtractor means receiving one of its input signals from said manual control station means through the contacts of said auxiliary relay means and another one from said dynamic compensator means and consequently increasing its output signal by a step and then exponentially decreasing it;

a summer means for controlling a position of said fluid relief means, said summer means summarizing output signals of said subtractor means and said controller;

a relay switch means being energized and changing its position while the output signal of said second deviation alarm means appears, said relay switch means being kept energized until it is manually reset;

means for providing for a manual reset of said relay switch; and first and second manual control station means for developing two set points for said surge control line, said first and second manual control station means being connected to said controller and to said first and second backup deviation alarm means through said relay switch means.

* * * * *